May 8, 1934.                     F. J. OVEN                     1,957,798
                                  GASKET
                            Filed Dec. 1, 1930
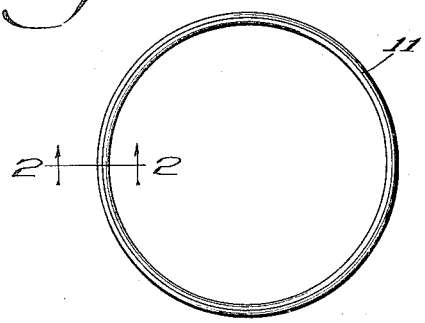
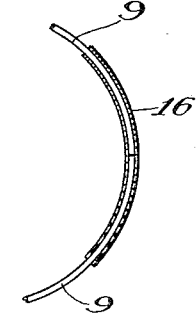
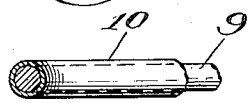
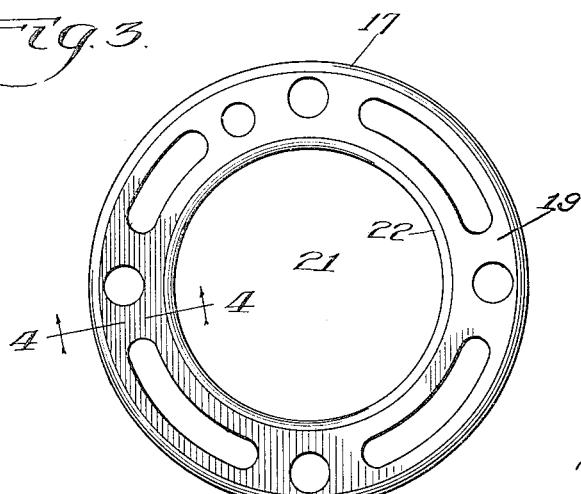
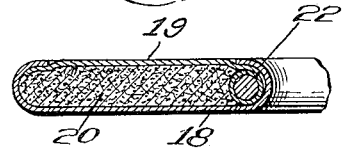
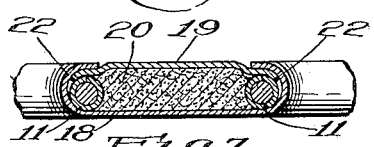
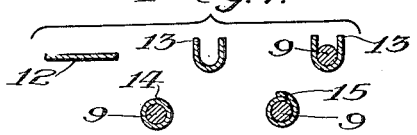
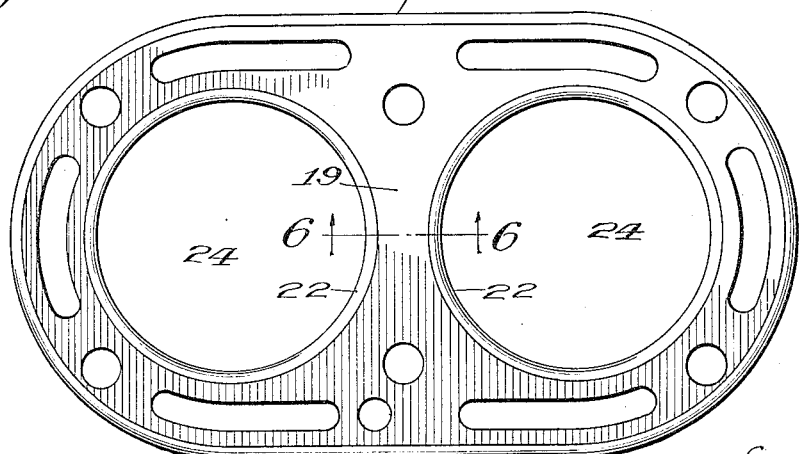
Inventor:
By Frank J. Oven Patented May 8, 1934

1,957,798

UNITED STATES PATENT OFFICE 1,957,798

GASKET

Frank J. Oven, Chicago, Ill., assignor to Victor Manufacturing & Gasket Company, Chicago, Ill., a corporation of Illinois Application December 1, 1930, Serial No. 499,275

1 Claim. (Cl. 288—1)

This invention relates to that class of gaskets in which the gasket is reenforced about the port opening by a ring embedded in the gasket.

Heretofore it has been the practice to form the ring by cutting wire to desired length, abutting or overlapping the ends and fastening them together by welding or brazing. This requires careful work to produce a ring of the required size. It is more difficult when the port opening is of irregular size and the ring is shaped accordingly.

The object of the invention is to enable reenforcing wire rings to be made of predetermined and uniform size without the necessity of welding, brazing or otherwise uniting the ends of the wire.

Another object of the invention is to provide a retainer for the wire reenforce which not only holds it in shape but enables it to be made always of uniform size and in any shape desired.

And another object of the invention is to provide a sleeve adapted to enclose the whole or only the end portions of the wire and retain the ends of the wire to form the reenforcing ring.

In the accompanying drawing I have shown specific embodiments of the invention for the purpose of this application and referring thereto Fig. 1 shows a complete ring, the wire being encased in its retainer.

Fig. 2 is a sectional view on the line 2—2 of Fig. 1 showing the wire at one end projecting beyond the retaining sleeve.

Fig. 3 is a plan view of a single cylinder gasket embodying the invention.

Fig. 4 is a sectional view on the line 4—4 of Fig. 3.

Fig. 5 is a plan view of a two-cylinder gasket.

Fig. 6 is a sectional view on the line 6—6 of Fig. 5.

Fig. 7 illustrates in section the several steps in forming the encased wire reenforce.

Fig. 8 illustrates a short sleeve enclosing the end portions of the wire.

In the preferred form of the invention the wire 9 is enclosed in a retainer sleeve 10 to form the complete ring 11. The retainer sleeve is stamped from the blank 12, Fig. 7, to channel form 13 to receive the wire 9 and then the channel is closed with its edges abutting as at 14 or overlapping as at 15. Since the retainer sleeve is stamped from sheet metal and formed as described, it can always be made of predetermined and uniform size and shape. The wire is cut as nearly as possible to fit snugly in the sleeve with its ends abutting but it will be appreciated that if the wire is not of full length it will still form a ring of the proper size because the sleeve retaining the wire determines the size and shape of the ring. If the ring is too long the ends may overlap in the sleeve but it is preferred that the ends should not be overlapped because this makes the ring ununiform in cross-section. While I prefer to provide a continuous sleeve it is apparent that a short sleeve 16 enclosing the end portions of the wire may be employed to form a ring suitable for some purposes. The gasket 17 of Fig. 3 comprises a metal bottom layer 18, a metal top layer 19 and an interposed layer 20 of asbestos or other suitable heat-resisting material. The layers forming the gasket are provided with registering openings to form the cylinder port openings 21 and the bottom layer 18 has a flange 22 which is projected through this opening and is lapped over the edge of the top layer 19 to form the wall of the opening 21 and to enclose the ring. The wall of the port opening may be formed by a separate flange or in some other manner according to gasket construction. In Fig. 5 the gasket 23 has two cylinder port openings 24 provided with rings of my invention. I do not limit the use of the rings to cylinder port openings because they can be used for water port openings, manifold port openings and other openings. The invention is adapted for rings made of wire or other material for use about any ports in any gaskets and it is particularly useful in those gaskets which are subjected to extremely high heat temperatures such as those used in Diesel engines, steam hammer engines and locomotive steam domes. The rings may be made for port openings of circular or irregular shapes and the construction of the ring facilitates forming the ring in desired irregular shapes. The wire forms the core of the ring and it is preferably wholly enclosed or encased within the sleeve with a snug fit, but it is not absolutely necessary that the edges of the sleeve should be abutted to form a closed sleeve so long as the core is retained in the sleeve to hold the shape and size of the ring. I use the word "wire" herein to indicate a core made of wire or other material equivalent for the purpose and of round or other cross-section. The retainer sleeve is preferably made of soft sheet metal which enables it to be easily fitted to a core of round or other cross-section.

While I have shown the invention in a preferred form suitable for many different uses, I reserve the right to make any changes in the form, construction, material and arrangement of parts to satisfy different conditions and within the scope of the following claim.

I claim:

A gasket having a port opening therein and comprising upper and lower metal layers and an interposed filler layer, a flange forming the wall of said port opening, and a ring seated in the gasket between the upper and lower layers and between said flange and the adjacent edge of the filler layer, said ring comprising a wire in ring form with juxtaposed ends and a metal sleeve enclosing the wire and holding it in size and shape to fit the flange.

FRANK J. OVEN.